(12) United States Patent
Liu et al.

(10) Patent No.: US 10,214,350 B2
(45) Date of Patent: Feb. 26, 2019

(54) INTELLIGENT AND INFORMATIZED MULTI-VEHICLE COLLABORATIVELY OPERATING MUNICIPAL REFUSE COLLECTION AND TRANSFER SYSTEM AND METHOD

(71) Applicant: HUNAN UNIVERSITY, Changsha, Hunan (CN)

(72) Inventors: Keli Liu, Changsha (CN); Guilin Wen, Changsha (CN)

(73) Assignee: HUNAN UNIVERSITY, Changsha, Hunan (CN)

( * ) Notice: Subject to any disclaimer, the term of this patent is extended or adjusted under 35 U.S.C. 154(b) by 86 days.

(21) Appl. No.: 15/125,963

(22) PCT Filed: Sep. 5, 2014

(86) PCT No.: PCT/CN2014/085978
§ 371 (c)(1),
(2) Date: Sep. 13, 2016

(87) PCT Pub. No.: WO2015/135308
PCT Pub. Date: Sep. 17, 2015

(65) Prior Publication Data
US 2017/0081120 A1      Mar. 23, 2017

(30) Foreign Application Priority Data
Mar. 14, 2014    (CN) .......................... 2014 1 0094494

(51) Int. Cl.
*B65F 3/00*      (2006.01)
*B65F 9/00*      (2006.01)
*G05D 1/02*      (2006.01)

(52) U.S. Cl.
CPC .................. *B65F 3/00* (2013.01); *B65F 9/00* (2013.01); *G05D 1/0297* (2013.01); *G05D 2201/0213* (2013.01)

(58) Field of Classification Search
CPC .... B65F 3/001; B65F 3/046; B65F 2003/023; B65F 5/005; B65F 1/16; B65F 3/20;
(Continued)

(56) References Cited

U.S. PATENT DOCUMENTS 5,215,423 A * 6/1993 Schulte-Hinsken ...... B65F 3/00
                                                                        414/408
5,375,960 A * 12/1994 Schiller ................... B65F 3/001
                                                                        414/406
(Continued)

*Primary Examiner* — Courtney D Heinle
*Assistant Examiner* — Luis A Martinez Borrero
(74) *Attorney, Agent, or Firm* — Raymond Y. Chan; David and Raymond Patent Firm

(57) ABSTRACT

An intelligent and information multi-vehicle collaboratively operating municipal refuse collection and transfer system and method are provided. The system comprises an automated system with multiple-degree of freedom intelligent dustbin grabbing, an operating system with two types of refuse vehicles collaborating, a multi-vehicle collaborative operation information system, and a fixed-point refuse collection operation confirmation and remote monitoring information management system for coordinating overall operation of the systems. The automated system with multiple-degree of freedom intelligent dustbin grabbing system is used for the refuse vehicles to automatically collect dustbins; the operating system with two types of refuse vehicles collaborating comprises a plurality of small- and medium-sized refuse vehicles and large capacity refuse vehicles. The small- and medium-sized refuse vehicles collect refuse in the dustbins according to multi-vehicle collaborative operation information with the support of the multi-vehicle collaborative operation information system, and the large
(Continued)

capacity refuse vehicles are used to dock with the collected refuse and transport the refuse out of town with the support of the multi-vehicle collaborative operation information system. The method is the implementation of the above system. The system and method have good operability and high degree of intelligence and provide good results of refuse disposal.

7 Claims, 1 Drawing Sheet

(58) Field of Classification Search
 CPC .. B65F 3/00; G05D 23/1904; G05D 23/1919; G05D 1/0297; G05D 2201/0213; G05D 23/1917; G05D 23/00; G05D 1/02
 USPC .............................. 701/484, 1, 468, 517, 519
 See application file for complete search history.

(56) References Cited

U.S. PATENT DOCUMENTS

| | | | | |
|---|---|---|---|---|
| 5,501,567 A * | 3/1996 | Lanzdorf | ............... | B60G 3/20 280/86.5 |
| 5,599,071 A * | 2/1997 | Kann | ............... | B65F 1/004 298/1 B |
| 5,762,461 A * | 6/1998 | Frohlingsdorf | ....... | B65F 1/1484 414/408 |
| 5,813,824 A * | 9/1998 | Zanzig | ............... | B65F 3/00 414/408 |
| 5,931,628 A * | 8/1999 | Christenson | ............... | B65F 3/046 414/406 |
| 6,123,497 A * | 9/2000 | Duell | ............... | B65F 3/043 414/406 |
| 6,174,126 B1 * | 1/2001 | Zanzig | ............... | B65F 3/00 414/408 |
| 6,183,185 B1 * | 2/2001 | Zanzig | ............... | B65F 3/00 414/406 |
| 6,309,164 B1 * | 10/2001 | Holder | ............... | B65F 1/1452 414/399 |
| 6,390,758 B1 * | 5/2002 | McNeilus | ............... | B65F 3/001 414/408 |
| 6,563,433 B2 * | 5/2003 | Fujiwara | ............... | B65F 3/00 340/933 |
| 6,752,467 B1 * | 6/2004 | Palrose | ............... | B60P 1/34 298/11 |
| 7,412,307 B2 * | 8/2008 | Pillar | ............... | B65F 3/00 180/281 |
| 8,146,798 B2 * | 4/2012 | Flood | ............... | B65F 1/1484 235/375 |
| 8,392,065 B2 * | 3/2013 | Tolstedt | ............... | G05D 1/0214 701/41 |
| 8,714,440 B2 * | 5/2014 | Flood | ............... | B65F 1/1484 235/375 |
| 8,998,555 B1 * | 4/2015 | Ingham | ............... | B65F 3/0203 414/408 |
| 9,251,388 B2 * | 2/2016 | Flood | ............... | G06K 7/0004 |
| 9,378,489 B2 * | 6/2016 | .ANG.kerblom | ....... | G06Q 10/30 |
| 9,396,453 B2 * | 7/2016 | Hynes | ............... | B65F 1/1484 |
| 9,561,904 B1 * | 2/2017 | Osborn | ............... | B65F 3/046 |
| 9,669,431 B2 * | 6/2017 | Wollschlager | ............ | B07C 5/00 |
| 9,845,191 B2 * | 12/2017 | Schwartz | ............... | B65F 3/201 |
| 2001/0049583 A1 * | 12/2001 | Burnstein | ............ | B65F 1/1484 701/482 |
| 2002/0077875 A1 * | 6/2002 | Nadir | ............... | G06Q 10/08 705/39 |
| 2002/0182043 A1 * | 12/2002 | Anderson | ............... | B65F 3/001 414/469 |
| 2006/0151497 A1 * | 7/2006 | Underwood | ............ | B65F 1/006 220/200 |
| 2008/0061977 A1 * | 3/2008 | Maruca | ............... | B65F 1/1484 340/572.1 |
| 2011/0316689 A1 * | 12/2011 | Reyes | ............... | B65F 1/1484 340/532 |
| 2014/0060939 A1 * | 3/2014 | Eppert | ............... | E02F 3/342 177/1 |
| 2014/0314530 A1 * | 10/2014 | Strom | ............... | B65F 3/001 414/406 |
| 2015/0025708 A1 * | 1/2015 | Anderson | ............ | A61B 5/6804 701/2 |
| 2016/0300297 A1 * | 10/2016 | Kekalainen | ............ | G06Q 10/08 |
| 2017/0086230 A1 * | 3/2017 | Azevedo | ............... | H04L 67/12 |
| 2017/0109704 A1 * | 4/2017 | Lettieri | ............... | G06Q 10/1093 |
| 2017/0121108 A1 * | 5/2017 | Davis | ............... | B65F 3/041 |
| 2017/0352003 A1 * | 12/2017 | Bertoli | ............... | G06Q 10/0875 |
| 2017/0352202 A1 * | 12/2017 | Matos | ............... | G07C 5/008 |

\* cited by examiner

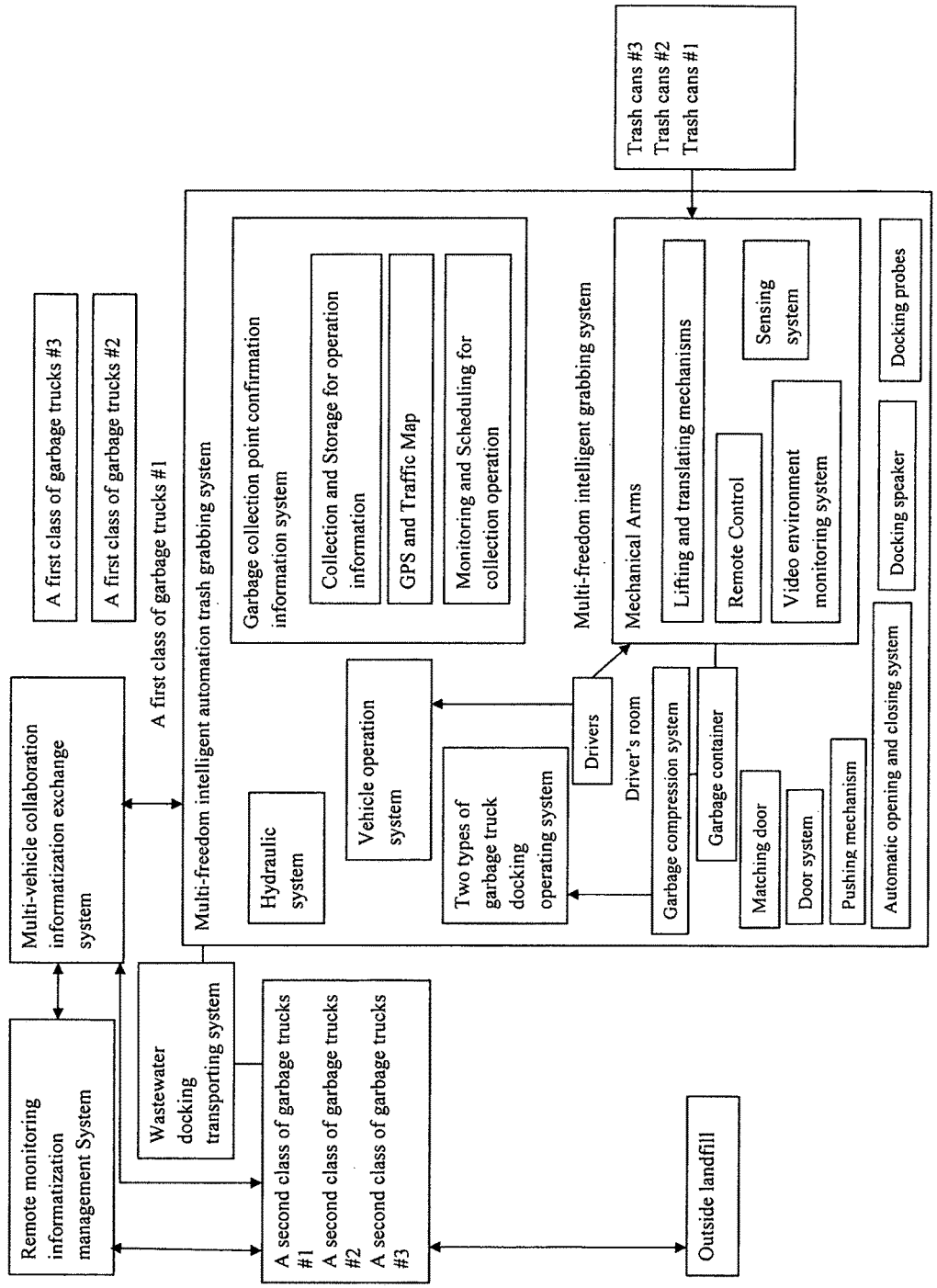

INTELLIGENT AND INFORMATIZED MULTI-VEHICLE COLLABORATIVELY OPERATING MUNICIPAL REFUSE COLLECTION AND TRANSFER SYSTEM AND METHOD

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise re-serves all copyright rights whatsoever.

BACKGROUND OF THE PRESENT INVENTION

Field of Invention

The present invention relates to an urban garbage treatment technology, and more particularly to an urban garbage collection system and method with intelligent informatization and multiple vehicle collaboration adapted for urban environment and quality construction and municipal engineering management.

Description of Related Arts

Everyone produces garbage, and everyone hates garbage. With the rapidly expansion of cities and the growth of the urban population, the quality of urban living and working environment are directly affected by urban garbage problems. Especially, the modern common land is gradually limited, so the residents in small areas oppose to establish garbage collection points or garbage transferal stations, so the contradictions between the modern urban garbage collection mode and the urban construction have become serious.

Currently, the main garbage collection and transportation mode in urban is "trash cans→garbage collection points-→garbage transportation stations→outside garbage landfills", wherein this mode has low efficiency, large labor density, and high labor-intensive, and the treatment of the garbage cannot be completely achieved, and moreover, the quality of the environment and the urban construction are directly affected by the garbage collection points and the garbage transportation stations. Even though the civilized cities, the garbage collection points and garbage transportation stations are located throughout the downtown area, so as to become direct impacts on the quality of the urbane environment and urban planning and constructions.

According to the technology of garbage collection and transportation, roadside trash cans are collected by domestic garbage trucks, and the people are required to get off the garbage trucks, and the trash cans are dragged on the side of the garbage tracks by hands, and the hanger is operated by the staffs by hands to hang the hangers on the trash cans, and then to lift up the trash cans in a semi-automatic mode in order to dump all the trash from the trash cans into the garbage trucks. After all trash is dumped into the garbage trucks, the trash cans are required to move back to their original positions by hands. Obviously, the above mentioned mode has low working efficiency, and harmful effects on workers' health and safety. In the foreign countries, the mechanical arms are provided to grab the trash cans, but the mechanical arms and the trash cans cannot be perfectly cooperated with each other, so the trash cans are easy to be hit by the mechanical arms, and the trash cans are fallen down while the trash cans are grabbing by the mechanical arms. Therefore, the cooperation between the trash cans and the mechanical arms are not symmetrical considered. In Hang-zhou, China, according to a perspective point of improving the quality of urban environment, the garbage trucks are full of garbage, and the garbage trucks are transported directly to the outside garbage landfill, but this mode still has a high operating cost. The concept of the large and small sizes of garbage trucks docking with each other is provided by foreign industries, but the design did not consider the bulky garbage transportation, the docking transportation for the waste and garbage, and anti-odor overflow issues are not considered through the above mentioned concepts. However, a special docking space is needed, and the docking space is equivalent to a dumpster. Currently, since multiple vehicle information cooperative systems have not been provided at home and abroad, the garbage trucks are running all over the streets, and the efficiency and operating costs are very high, so the new technologies mentioned above cannot be completely promoted.

In the overall technology, the core of the problem is that the perspective of system engineering is not used to solve the above mentioned problems. All aspects from the perspective of system engineering, all aspects of municipal waste collection and transportation, the intelligent garbage collection equipment, a set of garbage truck and trash can, multi-vehicle coordination operation, and information supervision are not considered in the overall technology. However, the conventional garbage truck operation is required for the garbage collection stations or transportation stations, so high efficiency and low operating costs are needed for the garbage collection stations or transportation, and the conventional garbage truck operation cannot has high efficiency and low operating costs.

SUMMARY OF THE PRESENT INVENTION

The invention is advantageous in that it provides an intelligent informatization multi-vehicle collaboration garbage collection and transportation method and system, which has good maneuverability, high intelligence, good effects for processing the garbage, the improvement for the urban environment, and provides a good living quality.

According to the present invention, the foregoing and other objects and advantages are attained by the following system and method.

An intelligent informatization, and multi-vehicle collaboration, urban garbage collection system according to a preferred embodiment of the present invention is illustrated, wherein the intelligent informatization, and multi-vehicle collaboration, urban garbage collection system comprises a multi-freedom intelligent automation trash grabbing system, a two types of garbage truck docking operating system, a multi-vehicle collaborative operation information system, a garbage collection point system and a remote controlling information management system for organizing the above mentioned system, wherein the trash cans can be automatically collected by the multi-freedom intelligent automation trash grabbing system, and two types of garbage truck docking operating system comprise a plurality of small and medium sizes of garbage trucks and a large capacity garbage truck, and the multi-freedom intelligent automation trash grabbing systems are installed on the small and medium sizes and large capacity of garbage trucks, wherein the trash cans are efficiently collected by the small and medium sizes of garbage trucks based on the multi-vehicle collaboration information operation systems through the multi-vehicle collaboration information, and the large capacity garbage truck is adapted to dock with the small and medium sizes of garbage trucks to transport the garbage out of the city based on the multi-vehicle cooperative information operation system.

An improvement of the present invention: The multi-freedom intelligent automation trash grabbing system comprises a multi-freedom intelligent grabbing system installed on a right side of a garbage container of the garbage truck, an operating end, a sensing system connected to the garbage container, and a remote control to grip, lift, and dump the trash inside the trash can to the garbage truck. A video environment monitoring system is installed in a driver's room of the garbage truck.

An improvement of the present invention: the small and medium sizes of garbage trucks are adapted to collect the trash cans all over the urban streets according to an area seamless management database and multi-vehicle collaboration real-time operation information, wherein the multi-freedom intelligent grabbing system is installed on a right side of a garbage container of the garbage truck, and a top portion of the garbage container comprises a garbage opening, which is operated by a door system which is linked with the multi-freedom intelligent grabbing system to operate an open door and close door position. A rear portion of the garbage truck comprises another door system to dock with other comportment. A lifting and a translating mechanism are arranged on a bottom portion of the garbage container. A pushing mechanism is designed inside the garbage container of the garbage truck.

An improvement of the present invention: The large capacity garbage truck can be seamlessly connected with a tail of the small and medium sizes of garbage truck through the lifting and translating mechanism, so the garbage can be automatically translated and compressed. The tail portion of the garbage container of the large capacity garbage truck comprises a docking speaker. A wrinkle and elastic rubber seal is sealed on an edge of the docking speaker, a matching door, an automatic opening and closing system, and a garbage compressing system designed inside the garbage container. A wastewater docking transporting system is arranged between the large capacity garbage truck and the small and medium sizes of garbage truck, wherein a lower end of the small and medium sizes of garbage trucks comprises docking probes. When the rears of two garbage trucks are approaching during the docking process, the docking probe is inserted into the docking speaker of the large capacity garbage truck, and then the garbage waste water inside the small and medium garbage trucks is extracted to the large capacity garbage truck to achieve garbage waste sealing transportation.

An improvement of the present invention: Each trash cans, large capacity garbage trucks, and small and medium garbage trucks have classification, orderly codes and labels. The multi-vehicle collaboration information system is based on various types of information analysis, and the forecasting of the completion of the tasks for garbage trucks. The urban electronic maps and urban traffic information are combined to be used to analysis a vehicle supporting schedule and a route program for the garbage trucks in different areas in real-time situation, and then automatically calculate and plan the optimal solution which small garbage trucks are collected by the large capacity garbage trucks, and further provide a fast transition route for exiting and entering the city, so as to ensure the efficiency for garbage collection and transportation.

A collection and transportation method for the multi-vehicle intelligent informatization collaboration system comprises the following steps:

(1) Based on the duty information and the barcode information, each of the garbage trucks is assigned the daily duty through the confirmation operation of the garbage collection point and remote monitoring and information management system.

(2) The first class of small and medium sizes of the garbage trucks depart to different areas and go through all the streets to collect the garbage inside the roadside trash cans. The multi-freedom intelligent garbage grabbing system is adapted to automatically recognize and record the barcode of the trash cans. After the collection tasks of the trash cans are completed, the task completion information, including the barcodes of the trash cans, the driver's information, the barcodes of the garbage trucks, and locations of the garbage trucks of the electrical traffic map, are wirelessly transmitted to the garbage collection points, and are processed by the remote monitoring information management system, wherein the task completion information can be analyzed and updated by the remote monitoring information management system. And then, updated information and tasks are sent back to the multi-vehicle collaboration information system. At the same time, the feedback information comprises barcodes, electronic route, and other task information for the next trash cans and the targeted trash cans, and the feedback information is displayed in the display screen.

(3) The second class of the garbage trucks are scheduled and departed based on the confirmation operation of the garbage collection points and the remote monitoring information management system.

(3.1) The second class of the garbage truck is docking with the first class of the garbage trucks.

(3.2) After the second class of the garbage trucks are full of the garbage, an out of town command is sent to the garbage collection point and the remote monitoring information management, and the second class of garbage trucks are required for moving out of the city. Based on the real time traffic condition information, optimal route of the garbage truck is generated to provide an effective path of exiting the urban and returning back to the urban city. After the garbage of garbage truck is completely dumped into the landfill, the garbage truck is assigned to the next preferred garbage collection points according to the real time refreshing results of the task statistical analysis.

An improvement of the present invention: In the step (3.1), the process is described as follows: At first, the first class of garbage trucks are parked in a suitable place, and the tail ends of the first class of the garbage trucks are aligned with that of the second class of the garbage trucks based on the video environment information. And then, the driver of the first class of the garbage truck can operate the garbage truck to be lifted and translated, and the docking mouth of the tail ends of the first class of the garbage trucks are docking with that of the second class of the garbage trucks. At this time, the opening of the rear door of the second class of the garbage trucks are operated based on the contact distance sensors which are arranged on contact surfaces of the tail ends of the garbage trucks (the sensor is installed on the second class of the garbage trucks and the trigger is installed on the first class of the garbage trucks.) This technology is able to ensure the opening of the rear door of the second class of the garbage trucks are opened at an appropriate time, so no garbage or odor overflow therefrom. At the same time, a pump is docked between the first and second class of the garbage trucks. After docking, the pushing mechanism in the first class of garbage truck is adapted to push the garbage into the second class of the garbage trucks. The compressing mechanism of the second class of the garbage trucks is activated to compress the garbage. After that, the two types of the garbage trucks are separated, and the rear doors of the two types of the garbage trucks are automatically closed. After the separation of the two types of the garbage trucks, the first class of the garbage trucks are continuously operated to collect the garbage of the roadside trash cans, and the second class of the garbage trucks are moving out of the city.

An improvement of the present invention: The confirmation of the operation of the garbage collection points and the remote monitoring information system are adapted to analyze and optimize the task completion information of the first class of the garbage trucks, and the garbage trucks are scheduled by the multi-vehicle collaboration information system to support the areas with large amount of mission; the method for docking the two types of garbage trucks and the transportation of the garbage are optimized.

An improvement of the present invention: the confirmation of the operation of the garbage collection point and remote monitoring information management are basic databases to store a mass of information, so as to achieve the objective of operation monitoring, the optimization of the task scheduling, and the analysis and evaluation for various types of on-site accidents.

Comparing with the current technology, the advantages of the present invention are described as follows:

1. The present invention is to establish a rapid garbage collection and transport reaction system, wherein the small and large garbage trucks are docking to transport the garbage; the driver can operate the trash can in the driver's room based on the multi-vehicle intelligent informatization collaboration system and real-time intelligent traffic information fusion technology.

2. The present invention is able to reduces the operating costs, and save a lot of urban land to produce a huge commercial value; and since the small and large sizes of garbage trucks are docking, each of garbage trucks are not required to be moved out of the city. The garbage compression mechanism is able to increase the garbage capacity; the multi-vehicle collaboration information system is able to prevent the un-clear of the mission of each garbage trucks; the driver independently collect the garbage in the trash can to reduce labor costs.

3. The present invention is to enhance the environmental quality of urban civilization, and no garbage collection points and transportation station are established in the city to save a lot of urban land; the present invention can be implemented quickly and easily realize intelligent informatization system to multiple times of garbage collection requirement.

4. the present invention is able to improve the supervision for processing the garbage, and based on the recognition of the GPS of the vehicle and barcodes of the trash cans, electronic map-matching technology, and intelligent informatization monitoring system of garbage collection, it is able to achieve a real-time confirmation of the garbage collection points, so as to avoid the existing inefficient and disturbances for the staffs inspecting around the garbage collection points.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 1 is a block diagram of a principle of an intelligent informatization and multi-vehicle collaboration urban garbage collection system according to a preferred embodiment of the present invention.

DETAILED DESCRIPTION OF THE PREFERRED EMBODIMENT

The following description further illustrates the drawings and the preferred embodiment.

As shown in FIG. 1, an intelligent informatization, and multi-vehicle collaboration, urban garbage collection system according to a preferred embodiment of the present invention is illustrated, wherein the intelligent informatization, and multi-vehicle collaboration, urban garbage collection system comprises a multi-freedom intelligent automation trash grabbing system, a two types of garbage truck docking operating system, a multi-vehicle collaboration informatization system, a garbage collection confirmation information system, and a remote monitoring informatization management system for organizing the above mentioned system, wherein the trash cans can be automatically collected by the multi-freedom intelligent automation trash grabbing system, and the two types of garbage truck jointing operating system comprises a plurality of small and medium sizes of garbage trucks and a large capacity garbage truck, and the multi-freedom intelligent automation trash docking systems are installed on the small and medium sizes and large capacity of garbage trucks, wherein the trash cans are efficiently collected by the small and medium sizes of garbage trucks based on the multi-vehicle collaboration informatization systems through the multi-vehicle collaboration information, and the large capacity garbage truck is adapted to dock with the small and medium sizes of garbage trucks to transport the garbage out of the city based on the multi-vehicle collaboration informatization operation system.

The multi-freedom intelligent automation trash grabbing system comprises a multi-freedom intelligent grabbing system installed on a right side of a garbage container of the garbage truck, an operating end, a sensing system connected to the garbage container, and a remote control to grip, lift, and dump the trash inside the trash can to the garbage truck; A video environment monitoring system is installed in a driver's room of the garbage truck.

An improvement of the present invention is: the small and medium sizes of garbage trucks are adapted to collect the trash cans all over the urban streets according to an area seamless management database and multi-vehicle collaboration real-time operation information; wherein the multi-freedom intelligent grabbing system is installed on a right side of a garbage container of the garbage truck, and a top portion of the garbage container comprises a garbage opening, and a garbage opening is operated by a door system which is linked with the multi-freedom intelligent grabbing system to operate an open door and close door position; a rear portion of the garbage truck comprises another door system to dock with other compartment; a lifting and a translating mechanism are arranged on a bottom portion of the garbage container; a pushing mechanism is designed inside the garbage container of the garbage truck.

The large capacity garbage truck can be seamlessly connected with a tail of the small and medium sizes of garbage truck through the lifting and translating mechanism, so the garbage can be automatically translated and compressed; the tail portion of the garbage container of the large capacity garbage truck comprises a docking speaker, a wrinkle and elastic rubber seal is sealed on an edge of the docking speaker, a matching door, an automatic opening and closing system, and a garbage compressing system designed inside the garbage container; a wastewater docking transporting system is arranged between the large capacity garbage truck and the small and medium sizes of garbage truck, wherein a lower end of the small and medium sizes of garbage trucks comprises docking probes, when the rears of two garbage trucks are approaching during the docking process, the docking probe is inserted into the docking speaker of the large capacity garbage truck, and then the garbage waste water inside the small and medium garbage trucks is extracted to the large capacity garbage truck to achieve garbage waste sealing transportation.

Each trash cans, large capacity garbage trucks, and small and medium garbage trucks have classification, orderly codes and labels. The multi-vehicle collaboration information system is operated based on various types of information analysis, and the forecasting of the completion of the tasks for garbage trucks. The urban electronic maps and urban traffic information are combined to be used to analysis a vehicle supporting schedule and a route program for the garbage trucks in different areas in real-time situation, and then automatically calculate and plan the optimal solution which small garbage trucks are collected by the large capacity garbage trucks, and further provide a fast transition route for exiting and entering the city, so as to ensure the efficiency for garbage collection and transportation.

The present invention is provided to solve the traditional lack of the urban garbage collection and operation based on an integrated system of trash cans-garbage trucks-multiple vehicles system-municipal engineering and management, wherein the present invention is able to solve the problems that no garbage collection points or transferring points are established in the urban, so that the garbage trucks are directly used to collect the urban's garbage, and then achieve a fast transportation, a low operation cost, and an information management technology.

During a operation method of the invention, the operation method comprises: an automatic docking, lifting, dumping trash, and intelligent multi-degree of freedom docking system and method; two types of garbage trucks docking method; multi-vehicle collaboration information system and method; the confirmation operation of the garbage collection points and the remote monitoring information management system and method; an innovation trash cans are compatible for mechanical automation grabbing, lifting, dumping arms.

In which, the intelligent multi-degree of freedom grabbing system and method for the automatic grabbing, lifting, and dumping trash cans is mainly focused to improve the traditional collection model that the staffs are required to get out from the garbage trucks, and the garbage tracks are dragged by the staff's hands, which generates problems of low operational efficiency, and the influence for health and safety for the staffs. The implementation of present invention is shown as follows: (1) The multi-freedom intelligent grabbing system (with mechanical arms and the like) is installed on a right side of a garbage container of the garbage truck, and sensor systems, such as, cameras, and RFID, are arranged on at an operation end and a moving end connected to the garbage container. (2) A surveillance system is arranged inside the driver's room, and the driver can independently and safely complete an entire garbage collection process. (3) The intelligent and multi-degree of freedom grabbing system has robot hands, robot arms, or any other similar automatic equipment which can achieve the following task: According to the spatial moving relationship between the video environment monitoring information and the mechanical system, the roadside trash cans can be automatically grabbed and lifted, so as to accurately dump the garbage inside trash cans into the garbage container of the garbage trucks, and then the trash cans are accurately placed back their original locations. The main technologies of the present invention comprise intelligent controls, remote control technologies, and servo actuation system which may be employed by other hydraulic driving, electric driving or other driving method. Due to that no staffs are needed to get out the garbage trucks to move the trash cans, the operation efficiency is relatively very high, and the operation is not affected by the weather, so as to improve the health and safety of the staffs.

Wherein, the two types of garbage trucks docking method are mainly for collecting all garbage trucks collection issues. The implementation of the present invention as shown as follows: (1) A large amount of the first class garbage trucks are small and medium sizes of garbage trucks, wherein the small and medium sizes of garbage trucks are adapted to collect the trash cans all over the urban streets according to an area seamless management database and multi-vehicle collaboration real-time operation information. (2) The first class garbage trucks comprises the multi-freedom intelligent grabbing system installed on a right side of a garbage container of the garbage truck; a top portion of the garbage container comprises a garbage opening, and a garbage opening is operated by a door system which is linked with the multi-freedom intelligent grabbing system to operate an open door and close door position; a rear portion of the garbage truck comprises another door system which is docked with other compartment; a lifting and a translating mechanism are arranged on a bottom portion of the garbage container; a pushing mechanism is designed inside the garbage container of the garbage truck. (3) A small amount of the second class of garbage trucks are large capacity of garbage trucks, wherein the large capacity garbage trucks can be seamlessly connected with tails of the second class of the small and medium sizes of garbage trucks, so the garbage can be automatically translated and compressed, so each of the second class of large capacity garbage trucks is adapted to collect the garbage from multiple first class of small and medium sizes of garbage trucks, and the garbage is transported to a large waste disposal or landfill sites. (4) The tail portion of the garbage container of the second class of the large capacity garbage truck comprises a docking speaker, a wrinkle and elastic rubber seal is sealed on an edge of the docking speaker, a matching door, an automatic opening and closing system, and a garbage compressing system designed inside the garbage container; the garbage container of the first class garbage trucks are incorporated with lifting and translating mechanism, and is docked with the docking speaker of the second class of garbage trucks, so as to achieve a tail-to-tail connection between the first and second class of garbage trucks, and then to transport the garbage. The second class of garbage truck comprises a garbage compressed system to improve the loading capacity. Associated driving mechanism may be a hydraulic, electric, or other similar mechanical driving mechanism. (5) A wastewater docking transporting system is arranged between the second class of the large capacity garbage truck and the first class of the small and medium sizes of garbage trucks, which are similar to a refueling system for the aircraft. A lower end of the small and medium sizes of garbage trucks comprises docking probes, when the rear ends of two garbage trucks are approaching during the docking process, the docking probe is inserted into the docking speaker of the large capacity garbage truck, and then the garbage deposed inside the small and medium garbage trucks is extracted to the large capacity garbage truck by the pump of the large capacity garbage truck to reach a garbage container of the large capacity garbage truck, so as to achieve a sealing transportation for garbage waste.

In the (3) and (4), the technologies for transporting garbage between two garbage trucks can prevent the garbage being exposed and leaked, and have anti-odor wastewater overflow designs, to ensure the two types of garbage trucks to be not affected the environment and no specific docking place is needed during the garbage docking transportation. (6) A docking video and a location alignment sensing system are designed on tail ends of two types of garbage trucks, and a wire or wireless remote control system are visually displayed in the driver's room, which can perceive and display the environment information for grabbing and dumping the trash cans, the loading condition of the garbage in the garbage trucks, the docking condition between small and medium sizes of garbage trucks, and the real time monitoring information during the whole process, so that the driver can safely and independently complete the grabbing, lifting, dumping operation for the garbage trucks, and the docking operation and garbage transportation between two types of garbage trucks. Large numbers of first class of small and medium sizes of garbage trucks are moving through the streets to collect garbage to ensure the feasibility and improve the collection efficiency, and a small number of the second class of the large capacity garbage trucks are collaborated with the first class of small and medium sizes of garbage trucks to solve the problems of transporting garbage out of the city, and to achieve low cost and high efficiency.

In which, the multi-vehicle information collaboration systems and methods are mainly operated for municipal waste collection and transportation, if the information collaboration systems and other modern technologies are not applied to collect the garbage, no matter how much garbage trucks, and how many sanitation workers are required to generate problems of low operation efficiency and high operation cost. The implementation of the present invention is shown as follows: (1) First, each of the trash cans, including the first class, and second class of garbage trucks has vehicle classifications, order labels, and databases. (2) The development of vehicle operation data storage and statistical analysis systems are mainly adapted to collect and store the GPS location information, to generate the task completion information for the garbage collection point, to generate the duty and task information for the urban area, and to analyze the re-al-time statistic and updates. (3) The development of collaboration and optimization of the division of the labor system, which has a mature and reasonable mission planning algorithm. Based on the above mentioned different types of information, the situation of the completion of the task of each garbage trucks can be analyzed, and is combined with a urban electronic map, and the real time traffic condition networking, so as to analyze and optimize the schedule and route of the garbage truck, and automatically calculate the most optimal method for collecting garbage from each of the first class of the small and medium sizes garbage truck to the second class of the large capacity garbage truck, so as to provide an effective path for exiting the urban and returning back to the urban, and ensure the efficiency of the collection and transportation. (4) The development of the multi-vehicle wireless data interactive systems in the real-time manner is mainly provided between each of the first class of the small and medium sizes of garbage truck, the first class of the small and medium sizes of the garbage truck and the second class of the large capacity garbage truck, and each of the second class of the large capacity garbage truck, so as to achieve the loading information and the remote monitoring command system, which is able to transmit related environment and operation information and vehicle GPS information to the remote monitoring information management system. Accordingly, the above mentioned systems are able to transmit, receive, and display the multiple sources of information. The main feature is that the system of the present invention is focused on the traffic condition and the flexibility of the volume of the garbage for the residents, and is combined with the urban electronic map and a display technology, so as to achieve the real-time information exchange between each garbage truck and between the garbage truck and the management department. In addition, the collaboration and scheduling of the garbage trucks, no empty garbage truck, and garbage trucks on scheduling routes, are achieved to improve the efficiency of the collection and operation of the garbage trucks, and further reduce the operation costs.

In which, the garbage collection points and the remote monitoring information management are adapted to solve problems of the lack of the scientific, high efficiency, objectivity requirements, and further has the lack of an effective operating mechanism to compatible with the development of the urban; When the quality of the urban environment is enhanced, the supervision is the main core issue. The implementation of the present invention is shown as follows: the garbage collection point system is mainly used to improve the collection and operation of the supervision, so as to avoid that more staffs arrive at the garbage collection point and reduce the efficiency of the garbage collection. (1) During the process of clamping the street side garbage tank with the multi-freedom intelligent trash grabbing system, by means of the information such as barcode, coding, or etc. of each garbage tank for identifying with RFID (Radio-Frequency Identification) or image identification technology which is integrated with the vehicle GPS system, automatically mark and record the duty completion information of the garbage collection point. (2) The completion information of the garbage collection points are recorded while GPS information for the vehicle is matched with the location information database, and at the same time, the grabbing, and dumping operation for the garbage trucks are completed by the intelligent multi-freedom grabbing system. (3) Based on the above mentioned description, an urban duty and task completion information are generated through the statistics and analysis method, which is a completion situation for the collection and transportation tasks for the garbage trucks. (4) The remote monitoring and informatizating management system is adapted for scheduling and doing the terminal management for the garbage trucks. The multi-source operation information is received and stored by the multi-vehicle wireless database in a real-time manner, so as to analyze and display the progress of the tasks. This system of the present invention is also a basic database to store a mass of information, so as to achieve the objective of monitoring, optimizing of the task scheduling, and the analysis and evaluation for various types' garbage trucks at on-site accidents.

Wherein, the multi-freedom intelligent grabbing system is able to grabbing, lifting, and dumping the trash cans, and also is compatible with the current trash cans which has an automatically opening and closing lid, and a main control system which cannot be installed on all trash cans; the current trash cans don't have intelligent identification and the barcode used for information management.

Wheels are installed on a bottom side of the trash cans and the staffs are required to drag the lids of the trash cans, and the mechanical arms are easy to hit on the trash cans while the mechanical arms are grabbing on the trash cans. The implementation of the present invention is shown as follows: (1) The lids of the trash cans are usually made of plastic and one side of the lid is pivotally connected with the body of the trash can, and the other side of the lid has a metal strip embedded therein in order to increase the weight of the lid. When multi-freedom intelligent grabbing system is adapted to grab the trash cans, the trash cans are placed upside down, and another side of the lid with the metal strip is sagging by the gravity in order to open the lid of the trash can; after the garbage is dumped from the trash cans, the trash cans are placed in the same position, and are placed uprightly, the lid of the trash can is automatically moved back to close the trash can by the gravity, and the metal strip is also able to prevent the lid being blown out to open the lid, so no odor overflows from the trash can. In the whole process, the hands of the staffs don't need to contact with the trash can, and no active control and external power are required to open/close the trash can. (2) The outer wall of the trash can comprises a bar code or serial number which is incorporated with the vehicle and image recognition system to achieve the confirmation of the garbage collection information. (3) The cross-section of the trash can may be a square or round, but the upper portion of the trash can is slightly larger than that of the bottom portion, and both sides of the outer surface of the trash can has some proper horizontal stripes to increases the friction of the outer surfaces, and a flat rack is arranged on the bottom of the trash to not only improve the stability of the trash can, but also prevent the trash can being sliding from the mechanical arms.

The existing urban garbage collection point and transportation station are ex-changed to be commercial lands which can be used as the compensation method of the cost, wherein the method is a new model of technology to solve a problem of the effective of the use of the cost. The above mentioned two types of garbage trucks docking operation, automatic operation of the mechanical arms, and multiple information collaboration are able to reduce the operating costs. However, in the promotion of a city, a number of ancillary garbage trucks, information management systems, and trash cans are required to be purchased in the initial stage, so problems of the cost of the municipal construction and the starting capital are generated. The implementation of the present invention is described as follows: the garbage collection points and the transportation station don't need to be established in the present invention. The existing urban garbage collection points and the transportation stations are occupied a lot of land, and especially in many high cost of the local area. The urban lands are changed to commercial lands, so as to prevent the severe impact on the surrounding environment caused by the garbage collection points and the transportation stations. Without the impact of urban planning, the commercial lands can be sold or leased to obtain a very considerable capital accumulation, which can not only possible be used to replace the municipal building modern sanitation equipment required for the present invention and but also can be the application of new technologies to achieve zero input engineering, and then it will also lower the operating costs or compensate the cost of the applications of the present invention.

Of course, the bottom of the garbage trucks and the garbage container of the garbage truck can be transformed. The consideration of the bottom rack of the first class of the garbage trucks is that the first class of garbage trucks are moving through the city, and the second class of the garbage trucks is that the carrying capacity and driving performance. The height of the bottom rack is determined by the technology for the two types of the docking garbage trucks. The performance of the grabbing and lifting of the multi-freedom intelligent grabbing system is determined by the stability of the side bodies of the first class garbage trucks. The compression technology of the garbage truck and other mechanism are matched with the common technical problems.

As shown in FIG. 1, a collection and transportation method for the multi-vehicle intelligent informatization and collaboration system comprises the following step:

(1) Based on the duty information and the barcode information, each of the garbage trucks are assigned the daily duty through the confirmation information of the garbage collection point and the remote monitoring and information management system. For example, the operating time is usually at 0:00 pm to 5:00 am.

(2) The first class of small and medium sizes of the garbage trucks depart to different areas and go through all the streets to collect the garbage inside the roadside trash cans. The process of the first class of the small and medium sizes of the garbage trucks is: when the first class of the garbage trucks are stopping next to the roadside garbage trucks, the multi-freedom intelligent informatization grabbing system is operated by the drivers to collect the garbage inside the garbage trucks; The multi-freedom operation features of the present invention has the advantages of that the drivers don't need to get out the garbage trucks, and other people don't need to assist the drivers. In the driver's room, the driver can remotely operate the system of the present invention to automatically grab and hold the trash cans through the video monitoring information, and the trash cans are lifted up and the garbage inside are accurately dumped into the garbage container through the opening, and then the trash cans are accurately placed back to their original locations.

According to the preferred embodiment of the present invention, the multi-freedom intelligent grabbing system is adapted to automatically recognize and record the barcode of the trash cans. After the collection tasks of the trash cans are completed, the task completion information, including the barcodes of the trash cans, the driver's information, the barcodes of the garbage trucks, and locations of the garbage trucks of the electrical traffic map, are wirelessly transmitted to the garbage collection points, and are processed by the remote monitoring information management system, wherein the task completion information can be analyzed and updated by the remote monitoring information management system. And then, updated information and tasks are sent back to the multi-vehicle collaboration information system. At the same time, the feedback information comprises barcodes, electronic routes, and other task information for the next trash cans and the targeted trash cans, and the feedback information is displayed in the display screen. For example, the condition information of the garbage collection point is displayed in the display screen in the driver's room; in the electronic map, the display of the garbage collection points are shown as null points, and the un-completed collection points are shown as red dot logo.

After multiple trash cans are collected, the compression button adapted to be operated the compression mission is activate by the driver, and the camera installed on the garbage container and the driver's room monitor are considered by the driver; the second class of the garbage trucks are docking with the first class of the garbage truck to collect the garbage through the confirmation information of the garbage collection points and the remote monitor information management system. After the optimization, the system of the present invention is adapted to send a transporting command to the garbage collection points and the remote monitoring information management system, wherein the transporting command includes a docking electronic route and barcode of the garbage trucks. After that, according to the above mentioned information, the assigned garbage truck moves to the garbage collection points to collect the garbage inside the trash cans, and transport the garbage from the other garbage trucks.

(3) The second class of the garbage trucks is based on the confirmation information of the garbage collection points and the remote monitoring information management system to schedule the departure of the garbage trucks.

(3.1) The second class of the garbage truck are docking with the first class of the garbage trucks. The tail space for the two docking garbage trucks is required for docking two garbage trucks. The general process is described as follows: The second class of the garbage trucks have the large capacity garbage truck body. At first, the first class of garbage trucks is parked in a suitable place, and the tail ends of the first class of the garbage trucks are aligned with that of the second class of the garbage trucks based on the video environment information. And then, the driver of the first class of the garbage truck can operate the garbage truck to be lifted and translated, and the docking mouth of the tail ends of the first class of the garbage trucks are docking with that of the second class of the garbage trucks. At this time, the opening of the rear door of the second class of the garbage trucks are based on a contact distance sensors arranged on contact surfaces of the tail ends of the garbage trucks (the sensor is installed on the second class of the garbage trucks and the trigger is installed on the first class of the garbage trucks.) This technology is able to ensure the opening of the rear door of the second class of the garbage trucks to open at an appropriate time, so no garbage or odor overflow therefrom. At the same time, the pump is docked between the first and second class of the garbage trucks. After docking, the pushing mechanism in the first class of garbage truck is adapted to push the garbage to the second class of the garbage trucks. The compressing mechanism of the second class of the garbage trucks is activated to compress the garbage. After that, the two types of the garbage trucks are separated, and the rear doors of the two types of the garbage trucks are automatically closed. After the separation of the two types of the garbage trucks, the first class of the garbage trucks are continuously operated to collect the garbage of the roadside trash cans, and the second class of the garbage trucks are moving out of the city.

(3.2) After the second class of the garbage trucks is full of the garbage, an out of town command is sent from the garbage collection point and the remote monitoring information management to activate the garbage trucks to move out of the city. Based on the real time traffic condition networking, the optimal route of the garbage truck is generated to provide an effective path for exiting the urban and returning back to the urban. After the garbage inside the garbage truck is completely dumped into the landfill, the garbage truck is assigned to the next preferred garbage collection points according to the real time refreshing results of the task statistical analysis, so as to improve the efficiency of the process.

In the process, due to the randomness of the amount of the garbage and traffic conditions at that time, there is a difference between the completion statuses of different areas after certain of time. The confirmation information of the garbage collection points and the remote monitoring information system are adapted to analyze and optimize the task completion of the first class of the garbage trucks, and the garbage trucks are scheduled by the multi-vehicle collaboration information system to support the areas with large amount of mission; the method for docking the two types of garbage trucks and the transportation of the garbage are optimized.

In the process, the confirmation information of the garbage collection point and remote monitoring information management are basic databases to store a mass of information, so as to achieve the objective of monitoring, the optimization of the task scheduling, and the analysis and evaluation for various types garbage trucks in on-site accidents.

The existing urban garbage collection point and transportation station are ex-changed to commercial lands which can be used as the compensation method of the cost, wherein the method is a new model of technology to solve a problem of the efficiency of the cost of the usage. The above mentioned two types of garbage trucks, docking operation, automatic operation of the mechanical arms, and multiple information collaboration are able to reduce the operating costs. However, in the promotion of a city, a number of ancillary garbage trucks, information management systems, and trash cans are required to be purchased in the initial stage, so problems of the cost of the municipal construction and the capital are generated. The implementation of the present invention is described as follows: the garbage collection points and the transportation station don't need to be established in the present invention. The existing urban garbage collection points and the transportation stations are occupied a lot of land, and especially in many high cost of the local area. The urban lands are changed to commercial lands, so as to prevent the severe impact on the surrounding environment for the garbage collection points and the transportation stations. Without the impact of urban planning, the commercial lands can be sold or leased to obtain a very considerable capital accumulation, which can not only possible be used to replace the municipal building modern sanitation equipment required for the present invention, but also achieve the application of new technologies, and then it will also lower the operating costs or compensate the cost of the applications of the present invention.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An intelligent informatization and multi-vehicle collaboration, urban garbage collection system, comprising:

a multi-freedom intelligent automation trash grabbing system comprising a multi-freedom intelligent grabbing system, a two types of garbage truck docking operating system comprising a plurality of small and medium sizes of garbage trucks and large capacity garbage trucks, a multi-vehicle collaboration informatization system, a garbage collection point confirmation information system, and a remote monitoring informatization management system for organizing said multi-freedom intelligent automation trash grabbing system, said two types of garbage truck docking operating system and a multi-vehicle collaborative operation information system, and said garbage collection point confirmation information system, wherein trash cans are able to be automatically collected by said multi-freedom intelligent automation trash grabbing system, wherein said multi-freedom intelligent automation trash grabbing systems is installed on said small and medium sizes and large capacity of garbage trucks, wherein said trash cans are efficiently collected by said small and medium sizes of garbage trucks based on said multi-vehicle collaboration informatization system through a multi-vehicle collaboration information, wherein said large capacity garbage trucks are adapted to be docked with said small and medium sizes of garbage trucks to transport a garbage out of a city based on said multi-vehicle collaboration informatization system, wherein said small and medium sizes of garbage trucks are adapted for collecting the garbage inside said trash cans placed all over urban streets based on an area seamless management database and multi-vehicle collaboration real-time operation information, wherein said multi-freedom intelligent grabbing system is installed on a garbage container of each of said small and medium sizes and large capacity of garbage trucks, and a top portion of said garbage container having a garbage opening operated by a door system which is linked with said multi-freedom intelligent grabbing system to operate between an open door position and a close door position, wherein a rear portion of said garbage truck comprises another door system to dock with other compartment, wherein lifting and translating mechanisms are arranged on a bottom portion of said garbage container, wherein a pushing mechanism is designed inside said garbage container of said garbage truck.

2. The intelligent informatization and multi-vehicle collaboration, urban garbage collection system, as recited in claim 1, wherein said large capacity garbage truck is seamlessly connected with a tail of said small and medium sizes of garbage truck through said lifting and translating mechanisms, so that the garbage is able to be automatically translated and compressed, wherein a tail portion of said garbage container of said large capacity garbage truck comprises a docking speaker, wherein a wrinkle and elastic rubber seal is sealed on an edge of said docking speaker, wherein a matching door, an automatic opening and closing system, and a garbage compressing system are designed inside said garbage container, wherein a wastewater docking transporting system is arranged between said large capacity garbage truck and said small and medium sizes of garbage trucks, wherein a lower end of said small and medium sizes of garbage trucks comprises at least a docking probe, wherein when rears of said two garbage trucks are approaching during a docking process, said docking probe is inserted into said docking speaker of said large capacity garbage truck, and then the garbage deposed inside said small and medium garbage trucks is extracted to said large capacity garbage truck to achieve a sealing transportation of the garbage.

3. An intelligent informatization and multi-vehicle collaboration, urban garbage collection system, comprising:

a multi-freedom intelligent automation trash grabbing system, a two types of garbage truck docking operating system, a multi-vehicle collaboration informatization system, a garbage collection point confirmation information system, and a remote monitoring informatization management system for organizing said multi-freedom intelligent automation trash grabbing system, said two types of garbage truck docking operating system and a multi-vehicle collaborative operation information system, and said garbage collection point confirmation information system, wherein trash cans are able to be automatically collected by said multi-freedom intelligent automation trash grabbing system, wherein said two types of garbage truck docking operating system comprises a plurality of small and medium sizes of garbage trucks and large capacity garbage trucks, wherein said multi-freedom intelligent automation trash grabbing systems is installed on said small and medium sizes and large capacity of garbage trucks, wherein said trash cans are efficiently collected by said small and medium sizes of garbage trucks based on said multi-vehicle collaboration informatization system through a multi-vehicle collaboration information, wherein said large capacity garbage trucks are adapted to be docked with said small and medium sizes of garbage trucks to transport a garbage out of a city based on said multi-vehicle collaboration informatization system, wherein each of said trash cans, large capacity garbage trucks, and small and medium garbage trucks have classification, orderly codes and labels, wherein said multi-vehicle collaboration informatization system is operated based on various types of information analysis, and a forecasting of completion of tasks for said garbage trucks, wherein urban electronic maps and urban traffic information are combined to be used to analysis a vehicle supporting schedule and a route program for said garbage trucks in different areas in real-time situation, and then automatically calculate and plan optimal solutions which small garbage trucks are collected by said large capacity garbage trucks, wherein a fast transition route is provided for exiting and returning back to the city, so as to ensure an efficiency for garbage collection and transportation.

4. A collection and transportation method for a multi-vehicle collaboration informatization system, comprising the following steps:

(a) based on duty information and barcode information, assigning daily duties to each of garbage trucks through a confirmation information of one or more garbage collection points and a remote monitoring and information management system;

(b) departing a first class of small and medium sizes of said garbage trucks to different areas and going through streets to collect a garbage inside roadside trash cans, wherein a multi-freedom intelligent grabbing system is adapted to automatically recognize and record a barcode of said trash cans, wherein after collection tasks of said trash cans are completed, a task completion information, including barcodes of said trash cans, a driver's information, barcodes of said garbage trucks, and locations of said garbage trucks of an electrical traffic map, are wirelessly transmitted to said garbage collection points and processed by a remote monitoring informatization management system, wherein said task completion information is able to be analyzed and updated by said remote monitoring informatization management system, and then, an updated information and tasks are sent back to said multi-vehicle collaboration informatization system, wherein at the same time, a feedback information, comprising said barcodes, electronic routes and other task information for said trash cans, is displayed in a display screen; and (c) operating a second class of said garbage trucks based on said confirmation information of said garbage collection points and said remote monitoring and information management system to schedule departures of said garbage trucks, wherein the step (c) further comprise the steps of:

(c.1) docking said second class of said garbage trucks with said first class of said garbage trucks; and (c.2) when said second class of said garbage trucks are full of the garbage, sending an out of town command to said garbage collection points and said remote monitoring and information management to activate said second class of said garbage truck to move out of a city, wherein based on a real time traffic condition networking, an optimal route of said garbage truck is generated to provide an effective path for exiting an urban and returning back to said urban, wherein after the garbage of said garbage truck is completely dumped into a landfill, said garbage truck is assigned to a next garbage collection point of said garbage collection points according to real time refreshing results of task statistical analysis.

5. The collection and transportation method for the multi-vehicle collaboration informatization system, as recited in claim 4, wherein in the step (c.1), said first class of said garbage trucks are parked in a suitable place, and tail ends of said first class of said garbage trucks are aligned with that of said second class of said garbage trucks based on a video environment information, and then, a driver of said first class of said garbage truck operates said garbage truck to be lifted and translated, wherein docking mouths of said tail ends of said first class of said garbage trucks are docking with that of said second class of said garbage trucks, wherein at this time, openings of rear doors of said second class of said garbage trucks are based on contact distance sensors arranged on contact surfaces of said tail ends of the garbage trucks, wherein after docking, a pushing mechanism of said first class of said garbage truck is adapted to push the garbage to said second class of said garbage trucks, wherein a compression mechanism of said second class of said garbage trucks is activated to compress the garbage, wherein after that, said first class and said second class of said garbage trucks are separated, and said rear doors of said first class and said second class of said garbage trucks are automatically closed, wherein said first class and said second of said garbage trucks are separated, said first class of said garbage trucks are continuously operated to collect the garbage of said trash cans on roadsides, and said second class of said garbage trucks are moving out of the city.

6. The collection and transportation method for the multi-vehicle collaboration informatization system, as recited in claim 4, wherein said confirmation information of said garbage collection points and said remote monitoring information system are adapted to analyze and optimize a task completion of said first class of said garbage trucks, and said garbage trucks are scheduled by said multi-vehicle collaboration informatization system to support areas with large amount of mission, wherein a docking of said first class and said second class of said garbage trucks and a transportation of the garbage are optimized.

7. The collection and transportation method for the a multi-vehicle collaboration informatization system, as recited in claim 4, wherein said confirmation information of said garbage collection point and said remote monitoring information management are basic databases to store a mass of information, so as to achieve an objective of monitoring, an optimization of garbage truck scheduling, and an analysis and evaluation for said first class and said second class of said garbage trucks at on-site accidents.

* * * * *